United States Patent [19]

Martensson

[11] Patent Number: 5,241,583
[45] Date of Patent: Aug. 31, 1993

[54] PORTABLE RADIO TELEPHONE WHICH TERMINATES AN ELECTRONIC KEYPAD LOCK FUNCTION UPON SENSING AN INCOMING CALL

[75] Inventor: Nils E. Martensson, Woking, England

[73] Assignee: Nokia Mobile Phones Ltd., Surrey, England

[21] Appl. No.: 686,791

[22] Filed: Apr. 17, 1991

[30] Foreign Application Priority Data

Apr. 20, 1990 [GB] United Kingdom ............... 9008921

[51] Int. Cl.⁵ ............................................. H04M 11/00
[52] U.S. Cl. ........................................ 379/58; 379/63; 340/825.5
[58] Field of Search ............... 379/58, 59, 60, 61, 379/62, 63; 340/825.5, 825.51

[56] References Cited

U.S. PATENT DOCUMENTS

| | | |
|---|---|---|
| 4,436,957 | 3/1984 | Mazza et al. |
| 4,453,042 | 6/1984 | Wolf et al. |
| 4,670,747 | 6/1987 | Borras et al. ............... 340/825.44 |
| 4,724,537 | 2/1988 | Monet ............................. 379/58 |
| 4,737,981 | 4/1988 | Hoberman et al. ........... 379/112 |
| 4,843,385 | 6/1989 | Borras ............................ 379/62 |
| 4,845,772 | 7/1989 | Metroka et al. .............. 379/61 |
| 4,860,336 | 8/1989 | D'Avello et al. ............. 379/63 |
| 4,945,556 | 7/1990 | Namekawa .................... 379/58 |

Primary Examiner—Jin F. Ng
Assistant Examiner—George J. Oehling
Attorney, Agent, or Firm—Perman & Green

[57] ABSTRACT

A portable radio telephone has a keypad including a plurality of externally accessible keys. The keys can be disabled (i.e. the keypad can be locked) to prevent accidental actuation thereof by performing a predetermined order of keystrokes using two of the keys which ordinarily have an alternative function associated therewith. Thus, for example, depression of the # key followed by the ON/OFF key temporarily enables the keyboard lock. The lock can be disabled simply by repeating the same keystrokes.

13 Claims, 2 Drawing Sheets

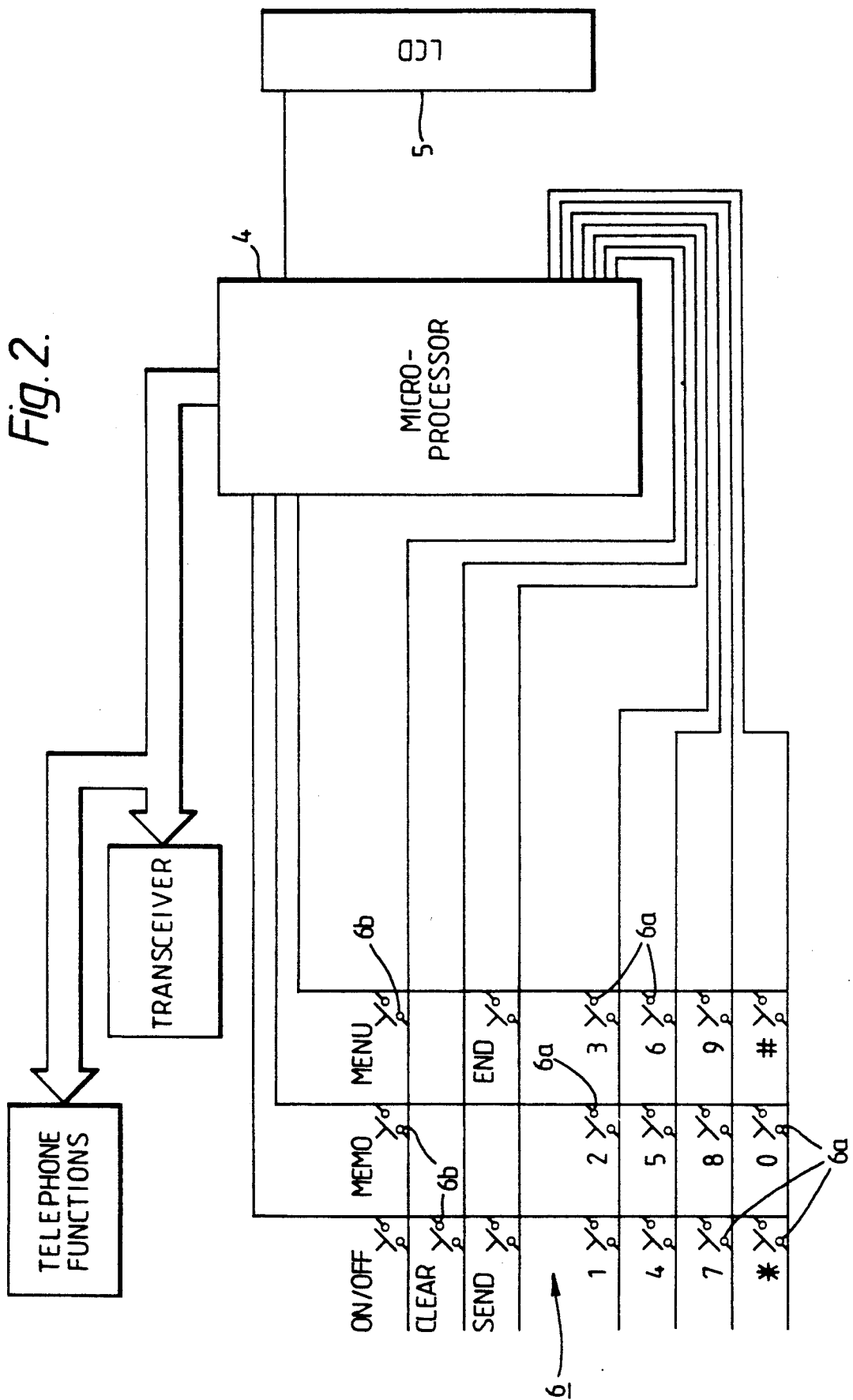

PORTABLE RADIO TELEPHONE WHICH TERMINATES AN ELECTRONIC KEYPAD LOCK FUNCTION UPON SENSING AN INCOMING CALL

This invention relates to a portable radio telephone apparatus comprising a keypad having a plurality of externally accessible and individually actuable keys.

BACKGROUND OF THE INVENTION

There is a trend nowadays for portable radio telephone units to be increasingly lightweight and compact. This in conjunction with the fact that such units are cordless offers not only enhanced mobility but also true portability, so that the user can readily carry a portable radiotelephone unit, for example in a pocket or briefcase, wherever he or she goes. Particularly in the case of cellular radio, this gives the user a very flexible and powerful means of communication, which can always be to hand.

Portable radio telephones necessarily comprise a user-interface including a keypad having a plurality of buttons or keys which can be depressed by the user in order to operate the telephone, i.e. to dial a telephone number or perform other functions such as for example to display a telephone number or other data stored in memory. However the very portability of the telephone apparatus means that it may be placed in locations where objects may interfere with the user-interface mechanism, or indeed the user himself may inadvertently depress one or more of the keys while handling the telephone, thereby activating the number or control keys. Inadvertent actuation of the keys may, for example, turn the apparatus on or off, cause transmission of unwanted signals and prevent use of a radio channel, or cause undesired functions to occur. Hence functions or operations may be accidentally engaged which can reduce the operating life of the battery which powers the portable telephone.

Our co-pending British patent application No. 8919215.7 (Our reference: PAT 89011) concerns a particularly compact telephone which includes a main body and an extending sleeve-like portion mounted for slidable movement between a retracted position when not in use and an extended position for use. The extending portion is adapted to conceal at least some of the buttons or keys when it is in the closed position to prevent accidental actuation of these buttons or keys.

European patent application EP-A-0,346,639 discloses a portable radio telephone including a pivotally mounted 'flip' element which contains a microphone and which can be flipped open for use and flipped to a closed position when not in use. In the closed position the flip element covers the keypad to prevent the keys from being mechanically actuated externally. However the keys are also disabled in case any foreign object should become lodged between the keypad and the flip element which might otherwise cause undesired actuation of one or more keys when the flip element is closed.

U.S. Pat. No. 4,670,747 discloses a portable two-way radio comprising an alphanumeric keypad having function keys and a display. The display consists of a series of system related menu icons surrounding an alphanumeric display area. A MENU key is used to select the desired function. The mode selection takes place by repeatedly pressing the special MENU key which causes a cursor to move in a circular fashion from icon to icon. A separate STEP key is then used to select the specific characteristic within the selected function. One of the menu icons corresponds to a keypad lock function. The lock function is selected by repeatedly depressing the MENU key until the cursor is located adjacent the icon corresponding to the keyboard lock. Pressing the STEP key once at this stage activates the keyboard lock. None of the keys (including the MENU key) except for the STEP key itself, will function when the lock is activated. Pressing the STEP key again deactivates the keyboard lock whereafter the MENU key may be pressed repeatedly to exit the lock function and select the desired function.

A drawback with the keyboard lock disclosed in U.S. Pat. No. 4,670,747 is that there is no unique predetermined sequence of keystrokes which activates the lock. On the contrary, the actual sequence of keystrokes required to activate the lock varies depending on which function of the radio is currently selected. Hence the user may have to depress the MENU key any number of times to select the lock function, confirmed by visually checking the cursor position on the display, and then depressing the STEP key to activate the lock. The same sequence of keystrokes does not always activate the lock. Moreover, once the lock has been activated only a single keystroke, i.e. depression of the STEP key, is required to deactivate the lock. This is disadvantageous for a portable radio telephone because it is very easy to accidently activate a single key, viz the STEP key which would release the keyboard lock and thereafter any further accidental actuation of the keys may enable power consuming features which would cause an unnecessary drain on the battery.

SUMMARY OF THE INVENTION

According to the present invention there is provided a portable radio telephone apparatus comprising a keypad having a plurality of externally accessible and individually actuable keys, means for sensing the actuation in a unique predetermined order of a first and second one of said keys respectively, and means responsive to said sensing means for disabling at least some of the other keys of said keypad.

A portable radio telephone in accordance with the invention has the advantage that no physical cover is employed to conceal the keys in order to prevent access thereto. On the contrary a simple predetermined sequence of keystrokes is employed to disable at least some of the keys. This disabling feature can be regarded as a keyboard lock which can readily be enabled or disabled by the user, even in the case of a telephone having a fixed geometry, i.e. without any folding or sliding member to physically cover the keys.

In addition it is noted that a telephone in accordance with the invention requires two (or more) keys to be actuated in a predetermined order in order to enable the keyboard lock. In contradistinction to the keyboard lock disclosed in the aforementioned U.S. Pat. No. 4,670,747, the present lock is toggled on or off whenever the two keys are actuated in a unique predetermined order. The two keys in question are preferably selected because they are keys which are not required in normal operation to be actuated in the predetermined order. For example the two keys may be the # key and the ON/OFF key. The keyboard lock may for example be enabled whenever the ON/OFF key is the next key to be depressed after the # key. Alternatively a time limitation may be included so that the keyboard lock is enabled only if the ON/OFF key is depressed within a predetermined time interval, e.g. 2 or 5 seconds, after depression of the # key. Instead of sequential keystrokes, the keyboard lock may be enabled if the two keys are actuated simultaneously or if the second key is actuated while the first key is held depressed. In any case the requirement for two keys to be depressed in a predetermined sequence means that it is highly improbable that the keyboard lock will be enabled accidentally. To this end, the two keys in question may be chosen because they are also well spaced apart. For example they may be at diametrically opposed corners of the keypad.

In a preferred embodiment the predetermined dual keystroke alternately enables and disables the keyboard lock. Hence, if the keyboard lock is currently disabled (switched off), it is enabled (switched on) by pressing the appropriate key pair in the predetermined order. On the other hand if the keyboard lock is currently enabled (switched on), it is disabled (switched off) by performing exactly the same keystrokes.

It is not necessary for special keys to be provided for enabling and disabling the keyboard lock. On the contrary each of the keys in question is preferably associated with at least one alternative function respectively. For example one of the keys may be the regular # key, as already indicated, while the other key may be the ON/OFF key which ordinarily (i.e. if not preceded by depression of the # key) would turn the telephone on or off.

Suitably the keyboard lock facility may be interrupted in response to the occurrence of a predetermined telephone function, for example if the telephone senses an incoming call. Suspension of the keyboard lock under these circumstances allows the user to answer the call immediately in the normal manner without first having to turn off the keyboard lock.

It is noted however that the user may be able to manually reset the keyboard lock during either an incoming or outgoing call in order not to inadvertently actuate any of the telephone keys during the call.

The keyboard lock preferably disables all of the keys on the telephone, except the two keys associated with the locking facility (which thus remain available to unlock the keyboard when it is locked). The alternative (regular) function of the keys in question is nevertheless preferably suspended. Thus for example, if the ON/OFF key is one of the keys in question it is not possible to turn the telephone on or off while the keyboard lock is enabled.

BRIEF DESCRIPTION OF THE DRAWINGS

An embodiment of the invention will now be described by way of example with reference to the accompanying drawings in which:-

FIG. 2 is a schematic diagram of the keypad and microprocessor employed in the telephone of FIG. 1.

DETAILED DESCRIPTION OF THE INVENTION

Figure 1:
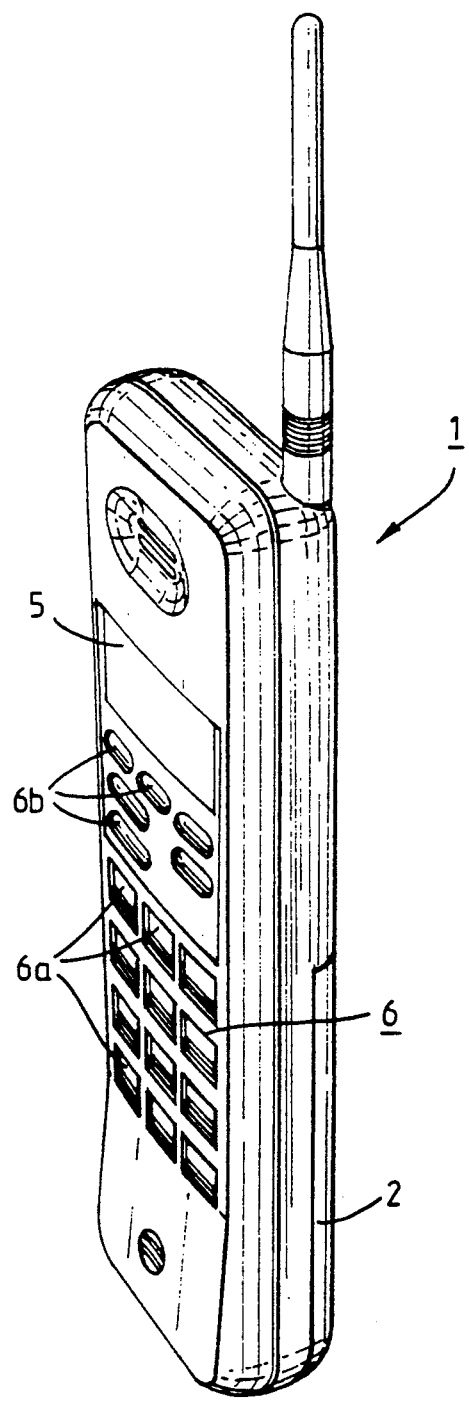
FIG. 1 is a perspective view of a portable cellular telephone in accordance with the invention.

The portable radio telephone shown in FIG. 1 is a cellular telephone 1 powered by a rechargeable battery pack 2. The telephone 1 includes a transceiver and all the other features conventionally found in a cellular telephone, as shown schematically in FIG. 2. Also, since these aspects of the telephone are not directly relevant to the instant invention no further details will be given here, except to say that a single microprocessor 4 (see FIG. 2) is employed to control all the basic functions of the telephone 1 and to control the keypad and display functions. Alternatively, however, the telephone functions may be controlled by a master microcomputer, while the keypad and display functions are under the control of a separate slave microcomputer coupled to communicate with the master microcomputer.

The user-interface of telephone 1 comprises a display, e.g. a liquid crystal display 5, itself well-known in the art and a keypad 6 on the front of the telephone 1. The display is coupled to and regulated by the microprocessor 4 in the usual manner. The keypad 6 essentially comprises two main sets of keys, namely alpha-numeric keys 6a associated with alpha-numeric data especially for dialling telephone numbers, but also (optionally) for entering alphanumeric data into the telephone memories, e.g. a subscriber number index; and a set of function keys 6b for enabling various predetermined functions or operations.

The keys 6a are arranged in four rows of three keys each. As is conventional for the numeric key layout of a telephone, the top row comprises keys for numbers 1, 2 and 3 respectively, the second row down for numbers 4, 5 and 6 respectively, the next row down for numbers 7, 8 and 9 respectively, and the bottom row for *, 0 and # respectively. Some or all of these keys may also be associated with alphabet information, as again is quite conventional. The alphabetic rather than numeric data is selected for example by preceding the alphanumeric keystroke with another predetermined keystroke or set of keystrokes, specifically using the function keys. Hence the alphabetic data mode may be enabled for example by preceding the particular keystroke with previously depressing a "MEMORY" or "STORE" key disposed among the function keys 6b.

As is usual in cellular telephones, the keys 6b include a "SEND" and "END" key for respectively initiating and terminating a telephone call. Another key, specifically located in the top left-hand corner is an "ON/OFF" key for turning the telephone on and off, i.e. by connecting and disconnecting the battery pack power supply. Another of the function keys may be a menu or function key labelled, for example, "MENU" or "FUNCTION" or with a suitable abbreviation thereof. Depression of this key enables a variety of pre-set menus, the related instructions of which are stored in memory, to be viewed and selectively enabled. The various menus are selected by depressing the appropriate alphanumeric keys after depressing the "MENU" or "FUNCTION" key. The relevant menu is shown to the user in words or abbreviations on the display panel 5. For example, the user may be able to select the ringing tone by appropriate menu selection. More sophisticated options may also be available via the menu facility. For example, the user may be able to enable the so-called Discontinuous Transmission mode which employs a voice activated switch which helps to reduce battery drain by transmitting only when speech is input to the microphone.

In accordance with the invention the keys 6a, 6b of keypad 6 can be temporarily disabled by actuating two of the keys in a predetermined sequence. In a specific embodiment implemented by the Applicant the two keys in question are firstly the # key 6a located at the bottom right hand corner of the entire keypad 6, and secondly the "ON/OFF" key 6b located at the top left hand corner of the entire keypad 6. Hence the keys in question are diametrically opposed, that is to say they are two of the most widely separated keys on the keypad 6. It is unlikely, therefore, that these two keys will be depressed accidentally or inadvertently either by the user or by a foreign object. Furthermore, these two keys are not required in normal operation of the phone to be depressed in succession (or together).

In the present embodiment the keyboard lock is enabled (i.e. the keypad is disabled) by pressing the ON/OFF key after the # key. The microprocessor recognises the occurrence of these two successive key depressions and thereafter when any other key is depressed the microprocessor will ignore the command, at least until the keyboard lock is removed. Indeed when the ON/OFF key alone is depressed the normal operation of this key is also suspended under the control of the microprocessor, i.e. the keystroke is ignored. The keyboard lock is disabled simply by pressing the # and ON/OFF keys again in the same sequence as before. Thereafter if the # and ON/OFF keys are depressed in succession the keyboard lock is alternately enabled and disabled.

When the keyboard lock is enabled this may be accompanied by an appropriate message on the display 5. For exampled, under the control of the microprocessor 4, the display 5 may show the message "KEY LOCK" or any appropriate alternative wording.

In practice the predetermined keystroke sequence of # and ON/OFF which institutes the keypad lock enable command will set a 'keypad lock enable' flag in the memory of microprocessor 4, whereas the next actuation of the # and ON/OFF keys in succession will clear the keypad lock enable flag. Each time any key is actuated the memory will be consulted to establish the current state of the keypad lock enable flag. If the flag is in place the microprocessor will suspend the normal operation associated with the actuated key (i.e. the keystrokes are ignored), whereas if the flag is cleared the normal function of the actuated key will be allowed to proceed.

If an incoming call is received by the telephone whilst the keyboard lock is enabled the microprocessor responds by clearing the keyboard lock enable flag. The keyboard lock is thus automatically disabled, thereby permitting the user to answer the call (e.g. by pressing any button on the keypad) immediately and in the normal manner without first having to conduct the keyboard unlocking routine.

According to specific design considerations it may be arranged that the keyboard lock cannot be activated during a telephone call. On the other hand it may be advantageous if the user is able to manually reset the keyboard lock, in the usual manner, either during an incoming or an outgoing call, so as to prevent accidental actuation of any of the telephone keys when the telephone is being handled during the call.

In view of the foregoing description it will be evident to a person skilled in the art that various modifications may be made within the scope of the present invention. For example, any suitable pair of keys may be selected to enable the keyboard lock, but of course these keys should not be required to be actuated together or in immediate succession during normal operation of the telephone. Furthermore any order of key depressions may be employed to enable the keyboard lock, as desired. For example the two keys may be pressed simultaneously, and/or successively or the first key may have to be held down while the second key is subsequently depressed. Also, in the successive keystroke mode a time-out facility maybe adopted whereby the keyboard lock is enabled or disabled (as appropriate) only if the second keystroke is performed within a predetermined time interval, e.g. 2 seconds or 5 seconds, of the first keystroke. Moreover, in some circumstances, e.g. to further reduce the risk of accidental actuation, it may be arranged that more than two keys have to be actuated in a predetermined order in order to set the keyboard lock. Finally, it has to be noted that it is not necessary for the keyboard lock to be implemented under microprocessor control. Instead, conventional logic circuitry may be employed capable of recognising the occurrence of the predetermined sequence of keystrokes and affecting disablement of the remaining keys in response thereto.

I claim:

1. A portable radio telephone apparatus comprising a keypad having a plurality of externally accessible and individually actuable keys, means for sensing the actuation of a first and second one of said keys respectively in a unique predetermined order, means responsive to said sensing means for disabling at least some of the other keys of said keypad, and means for automatically interrupting key disablement responsive to sensing an incoming call.

2. A portable radio telephone apparatus as claimed in claim 1, wherein the sensing means disable all the keys other than said first and second keys.

3. A portable radio telephone apparatus as claimed in claim 1, wherein the responsive means alternately re-enables and disables said other keys in response to subsequent actuations of said first and second keys in the predetermined order.

4. A portable radio telephone apparatus as claimed in claim 1, wherein said predetermined order of key actuation involves depressing said first and second keys simultaneously.

5. A portable radio telephone apparatus as claimed in claim 1, wherein said predetermined order of key actuation involves depressing said first and second keys successively.

6. A portable radio telephone apparatus as claimed in claim 1, wherein at least one of said other keys is disposed between said first and second keys on said keypad.

7. A portable radio telephone apparatus comprising a keypad having a plurality of externally accessible and individually actuable keys, means for sensing the actuation of a first and second one of said keys respectively in a unique predetermined order, said first and second keys being associated with at least one alternative function respectively, means responsive to said sensing means for disabling at least some of the other keys of said keypad, and means for automatically terminating key disablement when circuitry in the apparatus senses an incoming call.

8. A portable radio telephone apparatus as claimed in claim 7, wherein the sensing means disable said first and second keys in relation to said alternative functions respectively.

9. A portable radio telephone apparatus as claimed in claim 7, wherein the sensing means disable all the keys other than said first and second keys.

10. A portable radio telephone apparatus as claimed in claim 7, wherein the responsive means alternately re-enables and disables said other keys in response to subsequent actuations of said first and second keys in the predetermined order.

11. A portable radio telephone apparatus as claimed in claim 7, wherein said predetermined order of key actuation involves depressing said first and second keys simultaneously.

12. A portable radio telephone apparatus as claimed in claim 7, wherein said predetermined order of key actuation involves depressing said first and second keys successively.

13. A portable radio telephone apparatus as claimed in claim 7, wherein at least one of said other keys is disposed between said first and second keys on said keypad.

* * * * *